USOO6141449A

United States Patent [19]
Kawada et al.

[11] Patent Number: 6,141,449
[45] Date of Patent: Oct. 31, 2000

[54] CODING MODE DETERMINATION SYSTEM

[75] Inventors: Ryoichi Kawada; Takahiro Hamada; Shuichi Matsumoto, all of Tokyo, Japan

[73] Assignee: Kokusai Denshin Denwa Kabushiki Kaisha, Tokyo, Japan

[21] Appl. No.: 09/059,356

[22] Filed: Apr. 13, 1998

[30] Foreign Application Priority Data

Apr. 14, 1997 [JP] Japan ..................................... 9-111943

[51] Int. Cl.[7] ...................................................... G06K 9/00
[52] U.S. Cl. ........................................... 382/236; 382/245
[58] Field of Search ..................................... 382/236, 237, 382/238, 239, 242, 245, 246; 348/699, 416, 413, 402

[56] References Cited

U.S. PATENT DOCUMENTS

| 4,546,386 | 10/1985 | Matsumoto et al. | 358/136 |
| 4,985,782 | 1/1991 | Koga et al. | 358/335 |
| 5,412,435 | 5/1995 | Nakajima | 348/699 |
| 5,757,968 | 5/1998 | Ando | 382/236 |
| 5,798,719 | 8/1998 | Wise et al. | 341/67 |

*Primary Examiner*—Bijan Tadayon
*Assistant Examiner*—Seyed Azarian
*Attorney, Agent, or Firm*—Westman, Champlin & Kelly, P.A.

[57] ABSTRACT

This invention provides a mode determination system for maximizing the coding efficiency by minimizing the amount of generated encoded information. An intra-frame picture signal X of 16 pels 16 lines is divided into four sub-blocks of 8 pels×8 lines by a DCT block dividing unit. A DCT block dispersion calculation unit calculates the dispersions of the four sub-blocks, and a nonlinear function transform unit transforms the dispersions to values for estimating amounts of generated encoded information. An adder unit adds together the four values for estimating amounts of generated encoded information and outputs the sum. On the other hand, a motion compensated predictive difference Y of 16 pels×16 lines undergoes a processing similar to said intra-frame picture signal X by a DCT block dividing unit, a DCT block dispersion calculation unit, a nonlinear function transform unit and an adder unit, and a value for estimating an amount of generated encoded information for the motion compensated predictive difference Y is outputted from the adder unit. An comparator unit outputs a signal for selecting a mode according to which of the two values for estimating amounts of generated encoded information is smaller.

5 Claims, 3 Drawing Sheets

FIG. 3A
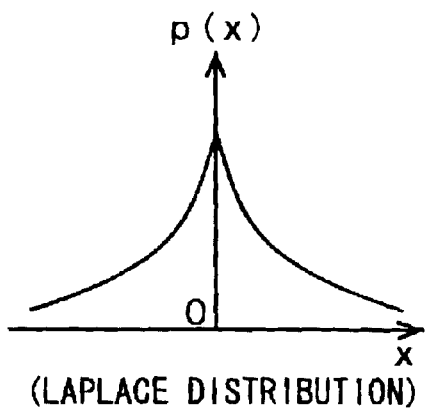
(LAPLACE DISTRIBUTION)
FIG. 3B
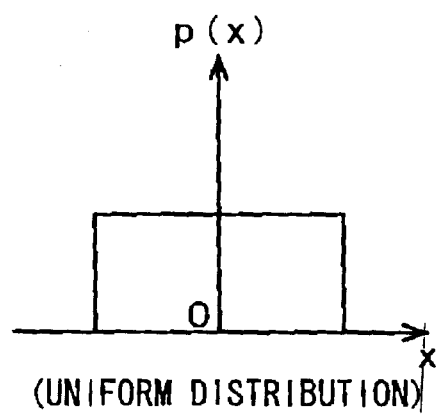
(UNIFORM DISTRIBUTION)
FIG. 4
|  | PRESENT INVENTION [dB] | PRIOR METHOD [dB] |
|---|---|---|
| AUTUMN | 38.4 | 38.2 |
| MOBILE | 30.0 | 29.8 |
| FASHION | 35.7 | 35.6 |
| GLEAVES | 28.8 | 27.6 |
| MARCHING | 27.1 | 27.0 |

CODING MODE DETERMINATION SYSTEM

BACKGROUND OF THE INVENTION

1. Field of the Invention

The present invention is related to a coding mode determination system for moving pictures, and particularly, to a coding mode determination system for performing a mode determination as to whether the coding is to be performed between frames or in a frame, which is suitable for providing a highly efficient coding by adaptively selecting an inter-frame predictive coding mode and an intra-frame coding mode.

2. Description of the Related Art

Conventionally, in the inter-frame motion compensated predictive compression coding represented by the ITU-T recommendation H.262 (MPEG-2), a picture is divided into many rectangular blocks of, for instance, 16 pels×16 lines, called macro-blocks, and motions in the picture are estimated for each block to provide a motion compensated prediction.

Further, to actually encode a motion compensated predictive difference or encode the pel value itself in a frame rather than predictive difference is determined according to a certain criterion from the viewpoint of coding efficiency.

For instance, the intra-frame coding is selected if a dispersion of the intra-frame pel values in a macro-blocks is smaller than a dispersion of the predictive difference in the macro-blocks, otherwise the inter-frame coding is selected. That is, the dispersion of the pel values of a macro-block X of 16 pels×16 lines in a frame (hereinafter referred to as intra-frame picture signal X) is obtained in a first dispersion calculation unit 41, and the dispersion of the motion compensated predictive difference signal Y of the macro-block (hereinafter referred to as predictive difference signal Y) is obtained in a second dispersion calculation unit 42 shown in FIG. 5. The dispersion values obtained in the first and second dispersion calculation units 41 and 42 are compared in a comparator unit 43, and if the dispersion value of the intra-frame picture signal X is smaller than the dispersion value of the predictive difference signal Y, a signal for selecting the intra-frame coding, or an intra-selection signal Z, is outputted from the comparator unit 43, and conversely, if the dispersion value of the predictive difference signal Y is smaller than the dispersion value of X, a signal for selecting the inter-frame coding, or an inter-selection signal Z, is outputted from the comparator unit 43.

However, in the standard coding method represented by the MPEG-2 or the like, a macro-block is further divided into four sub-blocks (size: 8 pels×8 lines), and each of the four sub-blocks is encoded by an orthogonal transformation coding such as DCT.

The amount of generated encoded information in coding is important for encoding efficiency, but the conventional dispersion compare in a macro-block does not always correspond to whether such amount is large or small, and thus there is a problem that it is not always an optimum determination method in the sense of mode determination that the coding efficiency is maximized.

SUMMARY OF THE INVENTION

It is the object of the present invention to eliminate the above described prior art problem, and provide a mode determination system in which the coding efficiency is maximized by minimizing the amount of generated encoded information.

In order to achieve the above-mentioned object, according to the present invention, there is provided a coding mode determination system for adaptively selecting an inter-frame predictive coding and an intra-frame coding in the compression coding of moving pictures using inter-frame prediction, comprising: first and second block dividing means for dividing a macro-block, a unit for coding mode switching, into a plurality of sub-blocks; first and second dispersion calculation means for respectively calculating the inter-frame predictive difference dispersion and the intra-frame dispersion for each of said sub-blocks; first and second nonlinear function transform means for respectively using a nonlinear function to transform the dispersion values obtained by said first and second dispersion calculation means to values for estimating amounts of generated encoded information; an adder means for respectively adding together the inter-frame and intra-fame transformed values obtained by said first and second nonlinear function transform means; and a coding mode determination means for determining one of an inter-frame and intra-frame coding mode as an usable mode according to which is greater or smaller said inter-frame or intra-frame sum.

In accordance with the present invention, first, macro-blocks of an inter-frame predictive difference picture and of an intra-frame picture are divided into sub-blocks, and the dispersion values in the inside of them are calculated, respectively. Then, they are transformed to estimated amounts of generated encoded information by a nonlinear function for estimating an amount of generated encoded information from a dispersion value. Further, the values are added together in the macro-blocks to calculate the estimated amounts of generated encoded information in the macro-blocks. The comparison of them between the inter-frame predictive difference picture and the intra-frame picture enables mode determination to be performed by the magnitude of the estimated amount of generated encoded information, and a determination can be achieved which is more appropriate in the sense of coding efficiency.

BRIEF DESCRIPTION OF THE DRAWINGS

FIGS. 3A and 3B are explanatory views of the distributions by the which the intra-frame picture signal and the predictive difference signal can be approximated.

FIG. 4 is an explanatory view showing the SN ratios between the decoded picture and the original picture in the coding mode determinations made by the present invention and the prior method.

DETAILED DESCRIPTION OF PREFERRED EMBODIMENT

Figure 1:
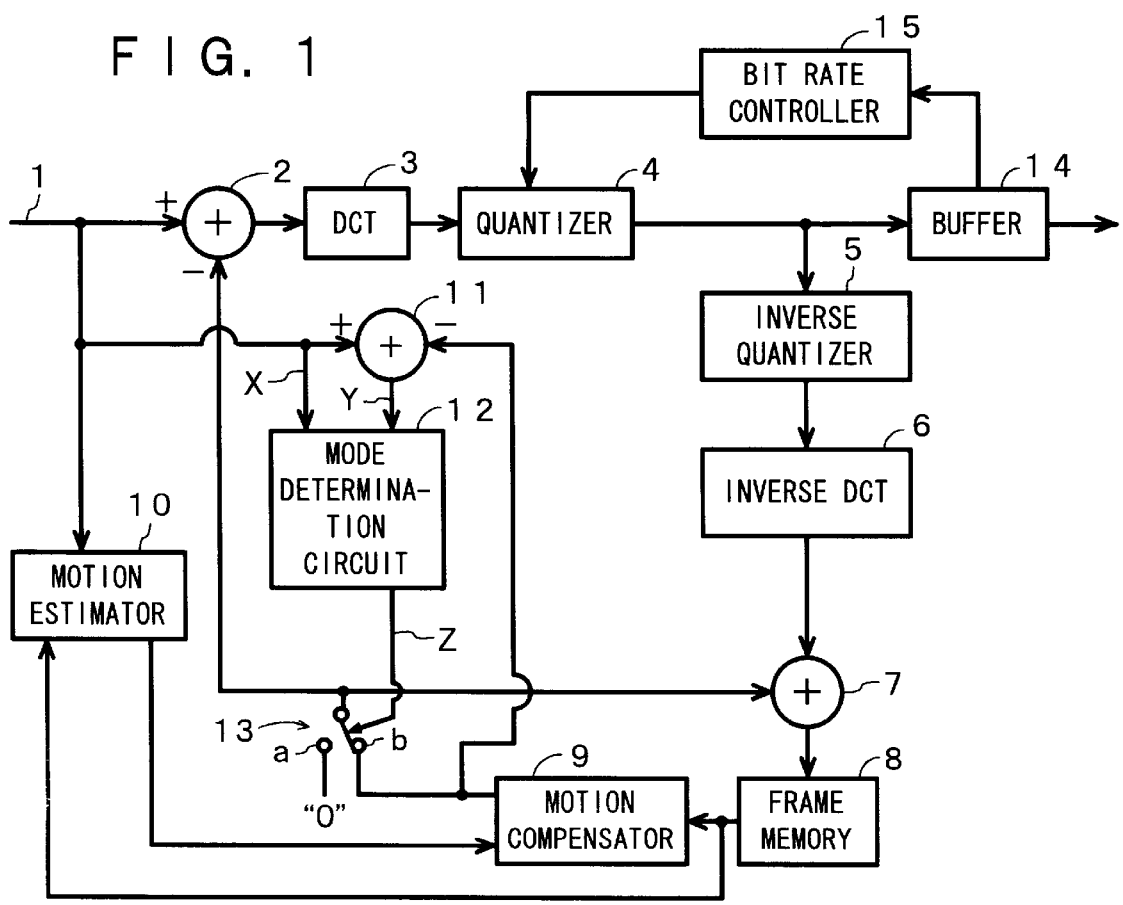
FIG. 1 is a block diagram showing the construction of an example of the coding system to which the present invention is applied.
Figure 5:
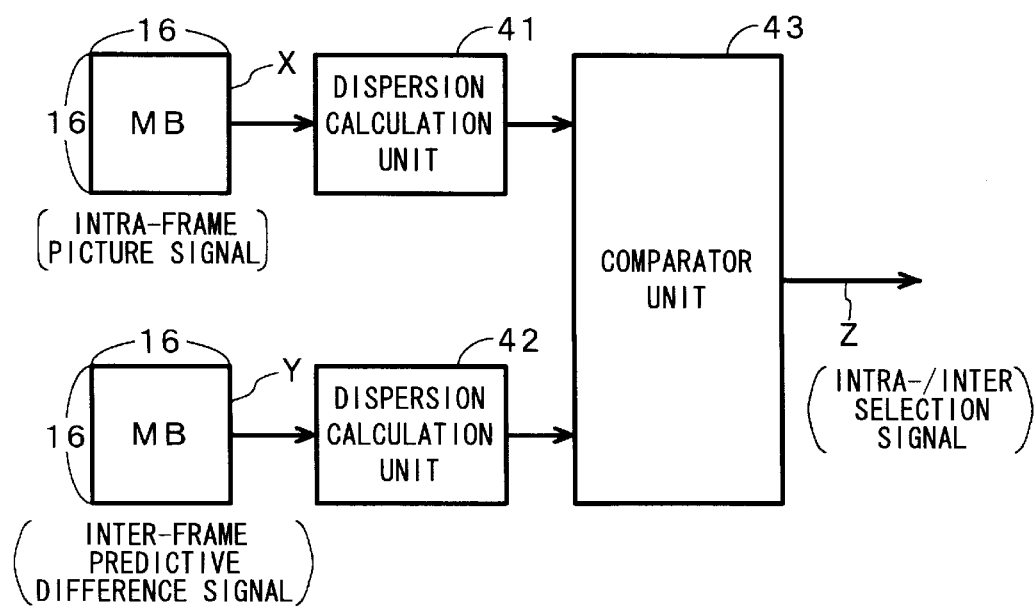
FIG. 5 is a block diagram showing the construction of the conventional coding mode determination system.

Now, the present invention is described in detail with reference to the drawings. FIG. 1 is a block diagram showing an example of the coding system to which the mode determination system of the present invention is applied.

An input picture 1 shown in the figure is inputted to the coder for each macro-block of, for instance, 16×16 pels. A subtractor 2 outputs the pel value itself of the input picture 1 if a switch 13 to be described later is connected to a terminal a, and if the switch 13 is connected to a terminal b, it outputs the difference between the input picture 1 and the motion compensated previous picture outputted from a motion compensator 9, or a motion compensated predictive difference. Assuming that the switch 13 is now connected to the terminal b, the description is continued below.

A DCT (Discrete Co-sine Transform) coder 3 DCT-codes the motion compensated predictive difference, and a quantizer 4 quantizes the DCT-coded motion compensated predictive difference. The quantized motion compensated predictive difference is temporarily stored in a buffer 14 and at the same time sent to an inverse quantizer 5. The motion compensated predictive difference inversely quantized in the inverse quantizer 5 is sent to an inverse DCT coder 6 to be decoded. The decoded signal is added in an adder 7 to the motion compensated previous picture outputted from the motion compensator 9 so as to be decoded to the original picture. The decoded original picture is stored in a frame memory 8. A bit rate controller 15 determines the quantization step size of the quantizer 4 based on the amount of data stored in the buffer 14. A motion estimator 10 performs a motion estimation processing for each macro-block from the input picture 1 and the picture stored in the frame memory 8.

A mode determination circuit 12 has inputted thereto the intra-frame picture signal X and the predictive difference signal Y obtained from the subtractor 11 to determine which has a smaller amount of coding, the intra-frame coding (intra-coding) or the inter-frame coding (inter-coding). The mode determination circuit 12 outputs the control signal Z for selecting the terminal a when it determines that the intra-frame coding has a smaller amount of coding, and for selecting the terminal b when it determines that the inter-frame coding has a smaller amount of coding. In addition, the terminal a is a terminal for supplying "0" signal.

Figure 2:
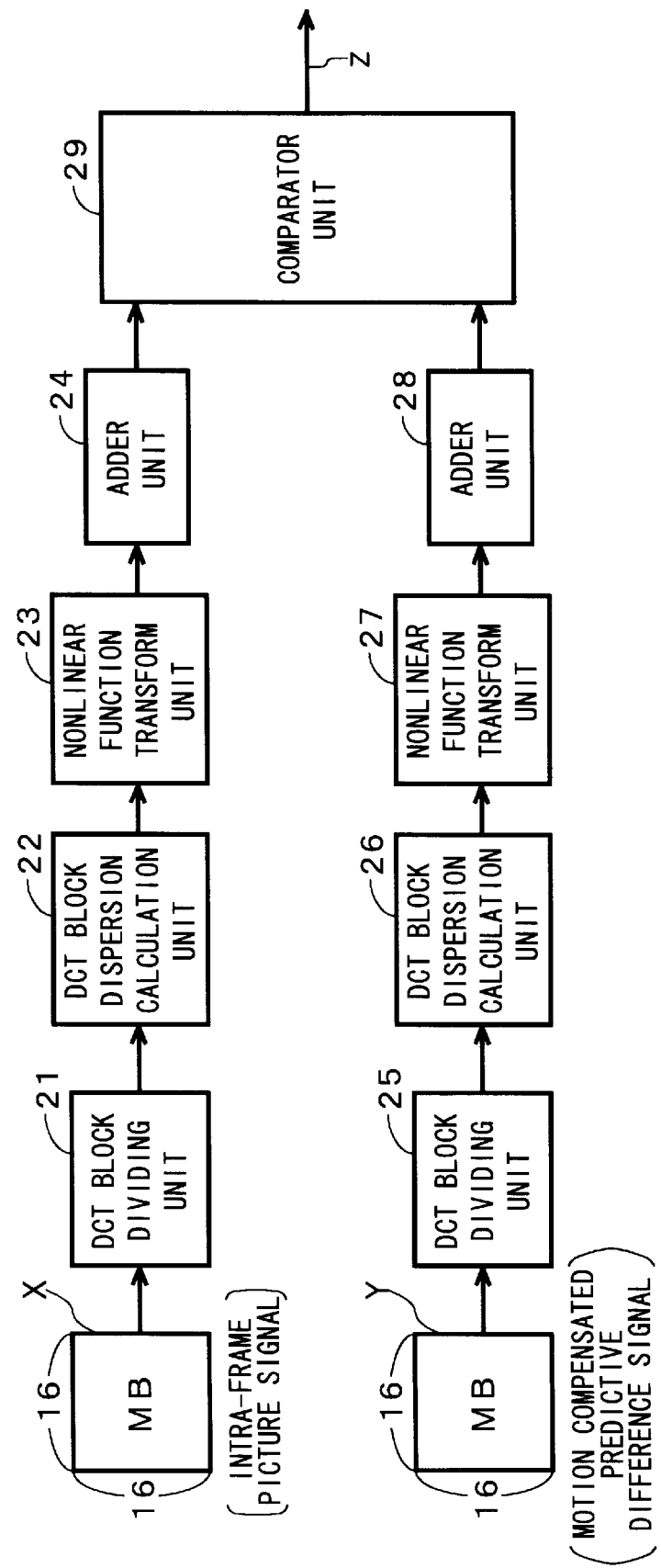
FIG. 2 is a block diagram showing the construction of an embodiment of the coding mode determination system of the present invention.

Now, an embodiment of the mode determination circuit 12 of the present invention is described with reference to FIG. 2. The mode determination circuit 12 comprises DCT block dividing units 21 and 25, DCT block dispersion calculation units 22 and 26, nonlinear function transform units 23 and 27, adder units 24 and 28, and a comparator units 29.

The DCT block dividing unit 21 divides the intra-frame picture signal X of the macro-block (16 pels×16 lines) into four DCT blocks(sub-blocks) of 8 pels×8 lines. Then, the DCT block dispersion calculation unit 22 calculates a dispersion $\sigma j^2$ (j=1, 2, 3, 4), for instance, by the following equation (1) for each DCT block divided in the DCT block dividing unit 21.

$$\sigma_j^2 = \frac{\sum_{i=1}^{64}(xi - \bar{x})^2}{64} \tag{1}$$

where xi is a pel value, and $\bar{x}$ is a mean value.

The nonlinear function transform units 23 applies a nonlinear function transform expressed, for instance, by the following equation (2) to the dispersion $\sigma j^2$, thereby to transform the dispersion $\sigma j^2$ to a numeric value for estimating an amount of generated encoded information. If the value for estimating the amount of generated encoded information is assumed to be $\sigma j^{2\prime}$, this $\sigma j^{2\prime}$ can be expressed as follows.

$$\sigma j^{2\prime} = \log_2 \sigma j^2 + C \tag{2}$$

where C is a constant.

Then, the adder unit 24 adds the four values $\sigma j^{2\prime}$ for estimating the amount of generated encoded information, and calculates the estimated amount of generated encoded information Sx for the macro-block by the following equation (3).

$$Sx = \sum_{j=1}^{4} \sigma_j^{2\prime} \tag{3}$$

The estimated amount of generated encoded information Sx for the intra-frame picture signal X obtained as described above is sent to the comparator 29.

The above explanation is directed to the obtaining of the estimated amount of generated encoded information Sx for the intra-frame picture signal X, the DCT block dividing unit 25, DCT block dispersion calculation unit 26, nonlinear function transform unit 27, and adder unit 28 also perform operations similar to those of the DCT block dividing unit 21, DCT block dispersion calculation unit 22, nonlinear function transform unit 23, and adder unit 24 to obtain an estimated amount of generated encoded information Sy for the predictive difference signal Y of the macro-block.

The estimated amounts of generated encoded information Sx and Sy are sent to the comparator unit 29 for determining which is greater or smaller. If the determination is Sx<Sy, the intra-selection signal Z is outputted from the comparator 29, and conversely, if Sx≧Sy, the intra-selection signal Z is outputted.

As described above, in accordance with this embodiment, the estimated amounts of generated encoded information Sx and Sy of the macro-block for the intra-frame picture signal X and predictive difference signal Y are directly compared, and the connection terminals of the switch 13 in FIG. 1 are selected according to which is greater or smaller, and thus, the accuracy of the intra-/inter-frame mode determination can be improved from the viewpoint of increasing the coding efficiency as compared with the conventional method in which the dispersion values of the individual macro-blocks are compared and the connection terminals of the switch 13 are selected according to which is greater or smaller.

An explanation is now given to the reason the above equation (2) is an equation for transforming a dispersion to a value for estimating an amount of generated encoded information.

Assuming now that the set of some data is xi (i=1, 2, . . . , N) and the probability that each xi appears is p(xi), the information amount I(x) of the set is expressed by the following equation (4). Further, for an infinite number of data, it is expressed by the following equation (5).

$$I(x) = -\sum_{i=1}^{N} p(xi) \log_2 p(xi) \tag{4}$$

$$I(x) = -\int_{-\infty}^{\infty} p(xi) \log_2 p(x) dx \tag{5}$$

Then, if the distribution shape of the probability P(x) is known, the relation between its dispersion value $\sigma^2$ and the information amount I(x) of the set is follows. It is expressed by the following equation (6) when the probability P(x) follows a Laplace distribution as shown in FIG. 3A, and expressed by the following equation (7) when the probability P(x) follows an uniform distribution as shown in FIG. 3B.

$$I(x) = \frac{1}{2} \log_2 2e^2\sigma^2 \text{(bits/sample)} \quad (6)$$

$$I(x) = \frac{1}{2} \log_2 12\sigma^2 \text{(bits/sample)} \quad (7)$$

As apparent from the equations (6) and (7), the relation between the amount of generated encoded information $I(x)$ and the dispersion $\sigma^2$ of data is as shown by the following equation (8) for any of the above distributions.

$$I(x) = k1 \log_2 k2\sigma^2 \quad (8)$$

where k1 and k2 are constants. Accordingly, the above equation (2) expresses an estimated value for the amount of generated encoded information for a DCT block (sub-block)

The second embodiment of the present invention is described below. In this embodiment, the estimation of the amount of generated encoded information is performed more accurately by utilizing the fact that the dispersion of the intra-frame picture signal X can be approximated by the uniform distribution and the dispersion of the predictive difference signal Y can be approximated by the Laplace distribution. That is, the following equation (2) is used in the nonlinear function transform unit 23 in FIG. 2, and the following equation (10) is used in the nonlinear function transform unit 27.

$$I(x) = \log_2 12\sigma_j^2 \quad (9)$$

$$I(x) = \log_2 2e^2\sigma_j^2 \quad (10)$$

Although the present invention has been specifically described in the above embodiments, the present invention is not limited to this, but it is obvious that modifications made to the extent that they do not depart from the spirit of the present invention are included in the present invention.

As described above, in accordance with the present invention, a macro-block is divided into sub-blocks, amounts of generated encoded information are estimated from the pel dispersion values in them and added together, and whether the intra-frame mode or the inter-frame mode is to be selected is determined according to the magnitude of the sums, so that the coding efficiency can be increased as compared with the prior method in which the determination is made based on the dispersion value of a macro-block.

In addition, since the coding efficiency can be increased in the present invention, the amount of generated encoded information can be decreased if the picture quality obtained by the present invention is the same as that of the prior method, while the picture quality can be increased if the amount of generated encoded information in the same.

FIG. 4 shows the result of an experiment in which the SN ratios between decoded pictures and original pictures by a compression coding at 7 M bits/sec were obtained using the method of the present invention and the prior method. FIG. 4 shows that for each known test picture, the SN ratio by the present invention was improved as compared with that by the prior method.

What is claimed is:

1. A coding mode determination system for adaptively selecting an inter-frame predictive coding and an intra-frame coding in the compression coding of moving pictures using inter-frame prediction, comprising:

a block dividing means for dividing a macro-block, a unit for coding mode switching, into a plurality of sub-blocks;

first dispersion calculation means for calculating the inter-frame predictive difference dispersion for each of said sub-blocks divided by the block dividing means; first nonlinear function transform means for using a non-linear function to transform the dispersion values obtained by said first dispersion calculation means to values for estimating amounts of generated encoded information;

first adder means for adding the values for estimating amounts of generated encoded information for each of said sub-blocks obtained by said first nonlinear function transform means to produce an inter-frame sum;

second dispersion calculation means for calculating the intra-frame dispersion for each of said sub-blocks divided by the block dividing means;

second nonlinear function transform means for using a nonlinear function to transform the dispersion values obtained by said second dispersion calculation means to values for estimating amounts of generated encoded information;

second adder means for adding the values for estimating amounts of generated encoded information for each of said sub-blocks obtained by said second nonlinear function transform means to produce an intra-frame sum; and a coding mode determination means for determining one of an inter-frame and intra-frame coding mode as a usable mode according to which is smaller of said inter-frame sum and said intra-frame sum.

2. A coding mode determination system of claim 1 wherein said first and second block dividing means divide a macro-block of 16 pels×16 lines into four sub-blocks of 8 pels×8 lines.

3. A coding mode determination system of claim 1 wherein the first and second nonlinear function transform means are expressed as follows, if the values for estimating an amount of generated encoded information is assumed to be $\sigma^{2'}$, the dispersion is assumed to be $\sigma^2$, and a and C are constant:

$$\sigma^{2'} 32 \log_2 a\sigma^2 + C.$$

4. A coding mode determination system of claim 1 wherein said first and second nonlinear function transform means use different nonlinear functions for intra-frame and inter-frame.

5. A coding mode determination system of claim 4 wherein said first nonlinear function transform means uses a nonlinear function obtained by utilizing the fact that the intra-frame picture signal can be approximated by an uniform distribution, and said second nonlinear function transform means uses a nonlinear function obtained by utilizing the fact that the fact that the inter-frame predictive difference signal can be approximated by a Laplace distribution.

* * * * *

UNITED STATES PATENT AND TRADEMARK OFFICE
CERTIFICATE OF CORRECTION

PATENT NO. : 6,141,449  
DATED : October 31, 2000  
INVENTOR(S) : Ryoichi Kawada et al.

Page 1 of 1

It is certified that error appears in the above-identified patent and that said Letters Patent is hereby corrected as shown below:

<u>Column 3:</u>
Cancel equation 1 and insert new equation:

$$\sigma_j^2 = \frac{\sum_{i=1}^{64}(xi-\overline{x})^2}{64} \qquad \cdots\cdots (1)$$

<u>Column 6 Claim 3:</u>
Cancel the equation and insert new equation:

$$\sigma^{2\prime} = \log_2 a\sigma^2 + C$$

Signed and Sealed this

Twenty-fourth Day of July, 2001

*Attest:*

Nicholas P. Godici

*Attesting Officer*

NICHOLAS P. GODICI  
*Acting Director of the United States Patent and Trademark Office*